Dec. 24, 1940.  F. B. HERZ  2,226,243
HEAT EXCHANGE UNIT AND METHOD OF MAKING SAME
Filed July 18, 1938  2 Sheets-Sheet 1
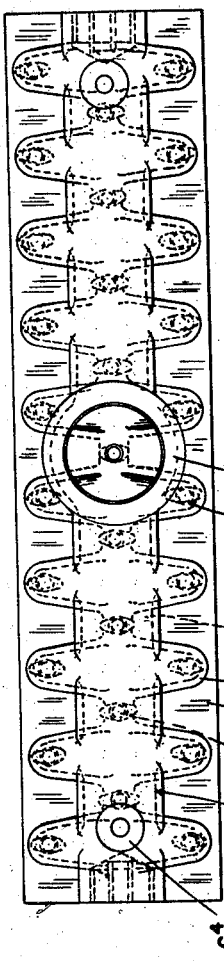
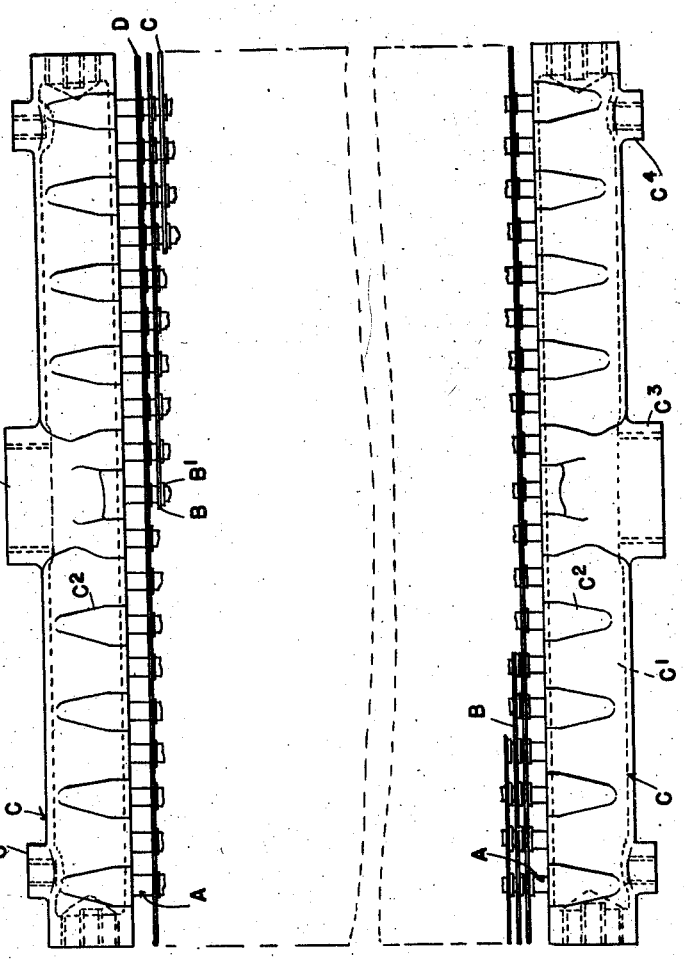
INVENTOR
FERDINAND B. HERZ
BY
ATTORNEYS Dec. 24, 1940.   F. B. HERZ   2,226,243
HEAT EXCHANGE UNIT AND METHOD OF MAKING SAME
Filed July 18, 1938   2 Sheets-Sheet 2

INVENTOR
FERDINAND B. HERZ
BY
ATTORNEY

Patented Dec. 24, 1940

2,226,243

UNITED STATES PATENT OFFICE 2,226,243

HEAT EXCHANGE UNIT AND METHOD OF MAKING SAME

Ferdinand B. Herz, Detroit, Mich., assignor to Borg-Warner Corporation, Chicago, Ill., a corporation of Illinois Application July 18, 1938, Serial No. 219,883

7 Claims. (Cl. 29—157.3)

The invention relates to heat exchange units and more particularly to constructions which are adapted for use in the heating of air by steam, hot water, or other heated fluid. It is the object of the invention to obtain a construction which can be readily manufactured and assembled and which has certain specific advantages as hereinafter set forth. To this end, the invention consists in the construction and the method of forming the same as hereinafter set forth.

In the drawings:

Figure 1 is a side elevation of my improved unit;

Figure 3 is a plan view;

Figure 2:
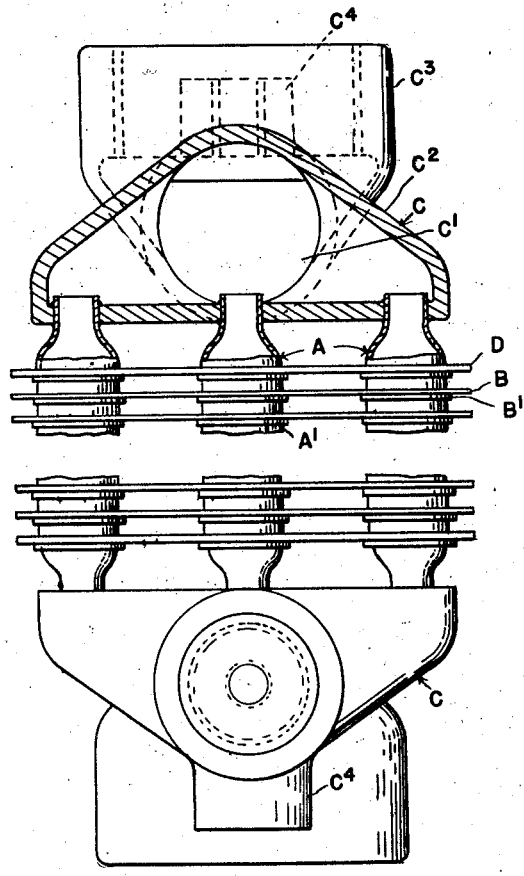
Figure 2 is an end elevation showing one of the headers in vertical cross section.
Figure 4:
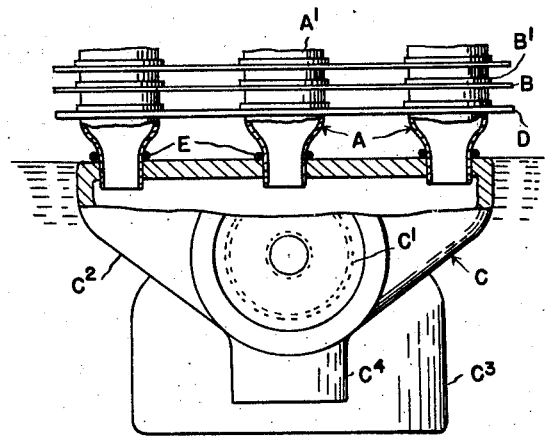
Figure 4 is a sectional end elevation showing the method of brazing the tubes to the headers.

My improved heat exchange unit is of the general type comprising a plurality of series of parallelly arranged tubes connected at their opposite ends to headers and having intermediate their ends a series of radiating fins spaced from each other to form air channels therebetween. It is one of the objects of my invention to facilitate the assembly of such a unit so as to secure not only good thermal conductivity between the tubes and the fins, but also a joint between the tubes and headers of sufficient strength to withstand the stresses to which the structure is subjected. It is usual to secure the fins to the tubes by soft solder which gives the desired thermal conductivity, but this material is insufficient in strength to join the tubes to the headers, inasmuch as the latter may contain steam under considerably higher than atmospheric pressure. Hard solder such as various brazes, silver solder, etc., has the requisite strength, but the temperature required for fusing it is much higher than the fusing point of soft solder. It is necessary to assemble the fins upon the tubes and to solder the same thereto before the tubes are assembled and secured to the headers, and consequently there is danger that in attaching the headers by hard solder this may loosen the connection between the fins and tubes. It is one of the objects of my invention to guard against this result as will be hereinafter explained.

To secure high thermal conductivity the structure is preferably made of copper or bronze, the tubes being preferably formed from seamless drawn copper tubing and the headers made of cast metal. With such construction, when the unit is exposed to heat or pressure or the combination of heat and pressure, there is a tendency to expand or distort in a manner to cause stresses at the tube header joints, which would result in failure if not properly guarded against. This is due to the fact that the header is usually of a non-symmetrical form so that there is more or less warping in the walls thereof. I have, however, avoided this defect by forming the header with a central portion which is substantially circular in cross section and of a cylindrical form. This can be connected to the central row of tubes, while the outer row of tubes on opposite sides of the central row are connected to wings or lateral extensions from the central portion. These extensions engage individual tubes of the series and leaves spaces therebetween in which the header is of cylindrical form. Such shape permits use of exceptionally high pressures and temperatures.

To eliminate the possibility of heating some of the tubes to a greater extent than others by improving elimination of air, and to insure proper distribution of steam, when unit is in service, the ends of the tube members which form the connection to the header are preferably reduced in size to produce a pressure loss at this point. This has the effect of equalizing the amount of steam entering the several tubes to produce an equal heating effect.

As specifically illustrated, A are the tubes preferably formed of seamless drawn tubing and which may be either of circular cross section or oval, if a streamline form is desired. B are the fins mounted on these tubes which are provided with the usual struck out flanges B' surrounding the apertures through which the tubes are passed and forming an extended surface for the soldered joint. Preferably, there are two or more parallel series of tubes which are embraced by the fins, and the joint is formed by first tinning or coating the tubes with solder, then placing the fins thereon in properly spaced relation, and then heating the assembly to a temperature at which the solder will melt and form the joint. At opposite ends of the tubes A are headers C. These are formed with a central portion C' which is substantially cylindrical and to which the central row of tubes A' are attached. Projecting laterally from opposite sides of this central portion are wing portions C² each engaging an individual tube of the outer series. The walls of these wings merge into the cylindrical cross section and the space between successive wings is sufficient to leave a considerable length of the cylindrical portion. There is also a nipple C³ for connecting with the supply conduits, and one or more lugs C⁴ for attachment to the supporting structure.

As before stated, there is danger in the attachment of the header to the tubes by hard solder that the heat may loosen the soft solder connection between the tubes and the fins. This I have guarded against by placing a relatively heavy fin or plate D beyond the last of the thin fins and between the same and the ends of the tubes which are attached to the header. The header is bored in registration with the tubes to permit insertion of the latter and the hard soldering is then effected in the following manner: Around each tube adjacent to the header is placed a ring E of the hard solder. The header is then immersed in a heated bath preferably of fused salt, which is maintained at a temperature high enough to melt the solder ring. The depth of insertion into the salt bath is such as to uniformly heat all of the walls of the header, but without directly heating the tubes. Also, the shield plate D which is above the header will prevent radiant heat from the bath impinging against the fins. The time interval required for melting the solder is comparatively short and such heat as is conducted upward through the tubes will be largely absorbed by the shield plate D, so that the temperature rise in the portions of the tubes soldered to the fins will not be high enough to impair the fin to tube joint. Plate D serves the additional purpose of shielding adjacent fins from the radiant heat of the bath, preventing excessive annealing of such parts. The fact that all portions of the bath are at equal temperature, will cause the uniform heating of all of the tubes at the point of engagement thereof with the header, so that the structure may be removed from the bath as soon as fusion occurs. It is, of course, understood that the joint is suitably fluxed for this operation, to insure the union of the solder with the header and tubes.

In first preparing the tubes A, the end portions A' thereof are contracted by suitable dies, so as to be of considerably smaller diameter. These are the portions that are soldered to the header which reduces the amount of solder required. Also, the reduction in cross sectional area of the space within the contracted tubes, offers a restriction to the flow of steam therethrough which will equalize the distribution between the tubes.

What I claim as my invention is:

1. The method of forming heat exchange units comprising the assembly of a plurality of series of tubes and fins sleeved on said tubes to embrace all of said series, uniting said fins to said tubes by soft solder, engaging a shield with said tubes between the endmost fin and the ends of the tubes, placing rings of hard solder about each tube, engaging said tubes with registering apertures in a header, and immersing said header in a fused bath having a temperature sufficient to melt the hard solder, said tubes projecting upward from the header and the soft solder joints being protected from the heat of said bath by said shield.

2. The method of forming heat exchange units comprising the assembly of a plurality of series of tubes and fins sleeved on said tubes to embrace all of said series, uniting said fins to said tubes by soft solder, engaging a shield with said tubes between the endmost fin and the ends of the tubes, placing hard solder adjacent to each tube, engaging said tubes with registering apertures in a header, and uniformly heating the ends of said tubes and adjacent header for a short interval to a temperature sufficient to melt the hard solder, the portions of said tubes having soft solder joints being protected from destructive heating during said interval by said shield.

3. A heat exchange unit comprising a series of tubes, fins sleeved upon said tubes and embracing the entire series, the end portions of said tubes beyond said fins being contracted in diameter to form a substantial restriction of at least 50% in the area thereof, and a header to which the contracted end portions of said tubes are attached.

4. In a heat exchange unit, a plurality of parallel series of tubes, fins sleeved on said tubes and embracing all of said series, a header to which the ends of said tubes are connected, and a heat absorbing and dissipating shield of greater thickness than said fins interposed between the finned portions of said tubes and said header and protecting said fins.

5. A heat exchange unit comprising a plurality of parallel series of tubes, fins sleeved upon said tubes and embracing all of said series, said fins having a soft solder connection with said tubes, a header to which the ends of said tubes are attached having a hard solder joint therewith, and a heat absorbing and dissipating shield interposed between the finned portion of said tubes and said header for protecting the soft solder joints and preventing the annealing of adjacent fins during the hard soldering of said tubes to said header and also forming a permanent protection therefor.

6. A heat exchange unit comprising a plurality of parallel series of tubes, fins sleeved upon said tubes and embracing all of said series, a header having a substantially cylindrical central portion connected to the central series of tubes, and integral spaced wing portions projecting laterally from said central portion and individually connected to the tubes of the outer series, said fins having a soft solder connection with said tubes and said header a hard solder connection therewith, and a plate of greater thickness than said fins interposed between the latter and said header and forming a protecting shield.

7. A heat exchange unit comprising a plurality of parallel series of tubes including a central series and series on opposite sides thereof, fins sleeved on said tubes and embracing all of said series, and a header connected to the ends of said tubes, the openings from said header into said tubes being substantially restricted with respect to the cross sectional area of the body of the tubes by at least 50% to compel substantially uniform flow of fluid from the header into all of the tubes.

FERDINAND B. HERZ.